US012752627B2

(12) United States Patent
Burgermeister et al.

(10) Patent No.: US 12,752,627 B2
(45) Date of Patent: Oct. 6, 2026

(54) IN-VEHICLE INFOTAINMENT SYSTEM AND METHOD THEREFOR, VEHICLE, MEDIUM AND PROGRAM PRODUCT

(71) Applicant: Bayerische Motoren Werke Aktiengesellschaft, Munich (DE)

(72) Inventors: Jochen Burgermeister, Munich (DE); Shiny Jiang, Shanghai (CN); Thoralf Reis, Munich (DE); Benoit Sauts, Blaustein (DE); Mingxuan Zhang, Beijing (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 18/839,111

(22) PCT Filed: Feb. 10, 2023

(86) PCT No.: PCT/EP2023/053405

§ 371 (c)(1),
(2) Date: Aug. 16, 2024

(87) PCT Pub. No.: WO2023/156310

PCT Pub. Date: Aug. 24, 2023

(65) Prior Publication Data

US 2025/0153568 A1 May 15, 2025

(30) Foreign Application Priority Data

Feb. 18, 2022 (CN) ......................... 202210152964.2

(51) Int. Cl.
*B60K 35/81* (2024.01)
*B60K 35/10* (2024.01)
(Continued)

(52) U.S. Cl.
CPC .............. *B60K 35/81* (2024.01); *B60K 35/10* (2024.01); *B60K 35/22* (2024.01); *H04W 4/48* (2018.02);
(Continued)

(58) Field of Classification Search
CPC ........ B60K 35/81; B60K 35/10; B60K 35/22; B60K 2360/164; B60K 2360/731;
(Continued)

(56) References Cited

U.S. PATENT DOCUMENTS

| | | | | |
|---|---|---|---|---|
| 10,212,274 | B2 * | 2/2019 | Alghoniem | H04M 3/543 |
| 2011/0105097 | A1 * | 5/2011 | Tadayon | H04W 4/02 455/418 |

(Continued)

FOREIGN PATENT DOCUMENTS

| | | | |
|---|---|---|---|
| EP | 1 114 981 | A2 | 7/2001 |
| EP | 3 694 195 | A1 | 8/2020 |
| WO | WO 2016/191064 | A1 | 12/2016 |

OTHER PUBLICATIONS

International Search Report (PCT/ISA/210) issued in PCT Application No. PCT/EP2023/053405 dated Jun. 30, 2023 (3 pages).

(Continued)

*Primary Examiner* — Richard M Camby
(74) *Attorney, Agent, or Firm* — Crowell & Moring LLP

(57) ABSTRACT

An in-vehicle information system includes at least one display device; at least one memory configured to store a computer program; and at least one processor configured to execute the computer program to perform operations including displaying a role configuration interface on at least one of the at least one display device in response to determining that a user's mobile electronic device is communicatively connected to the in-vehicle information system, the role configuration interface including role options for assigning
(Continued)

a user role for the mobile electronic device; receiving user input for the role options in the role configuration interface; and associating the mobile electronic device with function limitations corresponding to the user role assigned by the user input such that at least part of the functions of the in-vehicle information system is selectively available to the mobile electronic device depending on the assigned user role.

14 Claims, 5 Drawing Sheets

(51) Int. Cl.
*B60K 35/22* (2024.01)
*H04W 4/48* (2018.01)

(52) U.S. Cl.
CPC .. *B60K 2360/164* (2024.01); *B60K 2360/731* (2024.01)

(58) Field of Classification Search
CPC ........ B60K 2360/113; B60K 2360/122; B60K 2360/573; B60K 35/80; B60K 35/00; B60K 35/23; H04W 4/48; G06F 3/0482; G06F 3/04847; G06F 3/0488; G06F 3/04842; G06F 9/44505; G06F 9/451; B60R 11/0229
See application file for complete search history.

(56) References Cited

U.S. PATENT DOCUMENTS

2011/0295458 A1* 12/2011 Halsey-Fenderson ........................ G10L 13/00 701/1
2013/0065608 A1* 3/2013 Nakajima ............... G06F 21/32 455/456.1
2013/0274997 A1 10/2013 Chien
2014/0163774 A1* 6/2014 Demeniuk .............. H04W 4/70 701/2
2018/0060253 A1 3/2018 Gao et al.
2020/0097303 A1* 3/2020 O'Kane ............ G06F 16/24575
2020/0249822 A1* 8/2020 Penilla .................. G06F 3/0488
2021/0173532 A1* 6/2021 Van der Keere ... G06F 3/04847

OTHER PUBLICATIONS

Written Opinion (PCT/ISA/237) issued in PCT Application No. PCT/EP2023/053405 dated Jun. 30, 2023 (6 pages).
Cover page of EP 3 304 406 A1 published Apr. 11, 2018 (1 page).
Chinese-language Office Action issued in Chinese Application No. 202210152964.2 dated Mar. 25, 2026 with English translation (17 pages).

* cited by examiner

IN-VEHICLE INFOTAINMENT SYSTEM AND METHOD THEREFOR, VEHICLE, MEDIUM AND PROGRAM PRODUCT

BACKGROUND AND SUMMARY

The present disclosure relates to the field of intelligent devices, in particular, to an in-vehicle information system, a vehicle, a method for the in-vehicle information system, a non-transitory computer-readable storage medium and a computer program product.

Display devices in a vehicle (such as a display of an in-vehicle information system) can provide various information for users in the vehicle (such as a driver or passengers). When a user's mobile electronic device is connected to a vehicle device, these display devices may provide the users with notifications or information from the connected mobile electronic device. Although information played in the vehicle may have different importance or may be individualized, these different pieces of information would be seen or perceived by all the users in the vehicle.

Methods described in this section are not necessarily those previously envisaged or adopted. Unless specified otherwise, it should not be assumed that any method described in this section is considered as the prior art only because it is included in this section. Similarly, unless specified otherwise, the issues raised in this section should not be considered as well-known in any prior art.

Providing a mechanism for relieving, alleviating, or even eliminating one or more of the problems mentioned above will be advantageous.

According to one aspect of the present disclosure, an in-vehicle information system is provided. The in-vehicle information system comprises: at least one display device; at least one memory configured to store a computer program; and at least one processor configured to execute the computer program to perform operations comprising displaying a role configuration interface on at least one of the at least one display device in response to determining that a user's mobile electronic device is communicatively connected to the in-vehicle information system, the role configuration interface comprising role options for assigning a user role for the mobile electronic device; receiving user input for the role options in the role configuration interface; and associating the mobile electronic device with function limitations corresponding to the user role assigned by the user input such that at least part of the functions of the in-vehicle information system is selectively available to the mobile electronic device depending on the assigned user role.

According to another aspect of the present disclosure, a vehicle comprising the in-vehicle information system is provided.

According to further another aspect of the present disclosure, a method for an in-vehicle information system is provided, the in-vehicle information system comprising at least one display device, and the method comprises: displaying a role configuration interface on at least one of the at least one display device in response to determining that a user's mobile electronic device is communicatively connected to the in-vehicle information system, the role configuration interface comprising role options for assigning a user role for the mobile electronic device; receiving user input for the role options in the role configuration interface; and associating the mobile electronic device with function limitations corresponding to the user role assigned by the user input such that at least part of the functions of the in-vehicle information system is selectively available to the mobile electronic device depending on the assigned user role.

According to yet another aspect of the present disclosure, a non-transitory computer-readable storage medium with a computer program stored thereon is provided, and when executed by the at least one processor of the in-vehicle information system, the computer program performs the above-mentioned method.

According to still yet another aspect of the present disclosure, a computer program product is provided, the computer program product comprises a computer program, and when executed by the at least one processor of the in-vehicle information system, the computer program performs the above-mentioned method.

According to embodiments described below, these and other aspects of the present disclosure will be clear and will be illustrated referring to the embodiments described below.

The accompanying drawings exemplarily illustrate embodiments and form a part of the specification, which explain exemplary implementations of the embodiments together with the textual description of the specification. The illustrated embodiments are for illustrative purposes only and do not limit the scope of the claims. In all the accompanying drawings, similar reference numerals refer to similar but not necessarily identical elements.

DETAILED DESCRIPTION THE DRAWINGS

Figure 1:
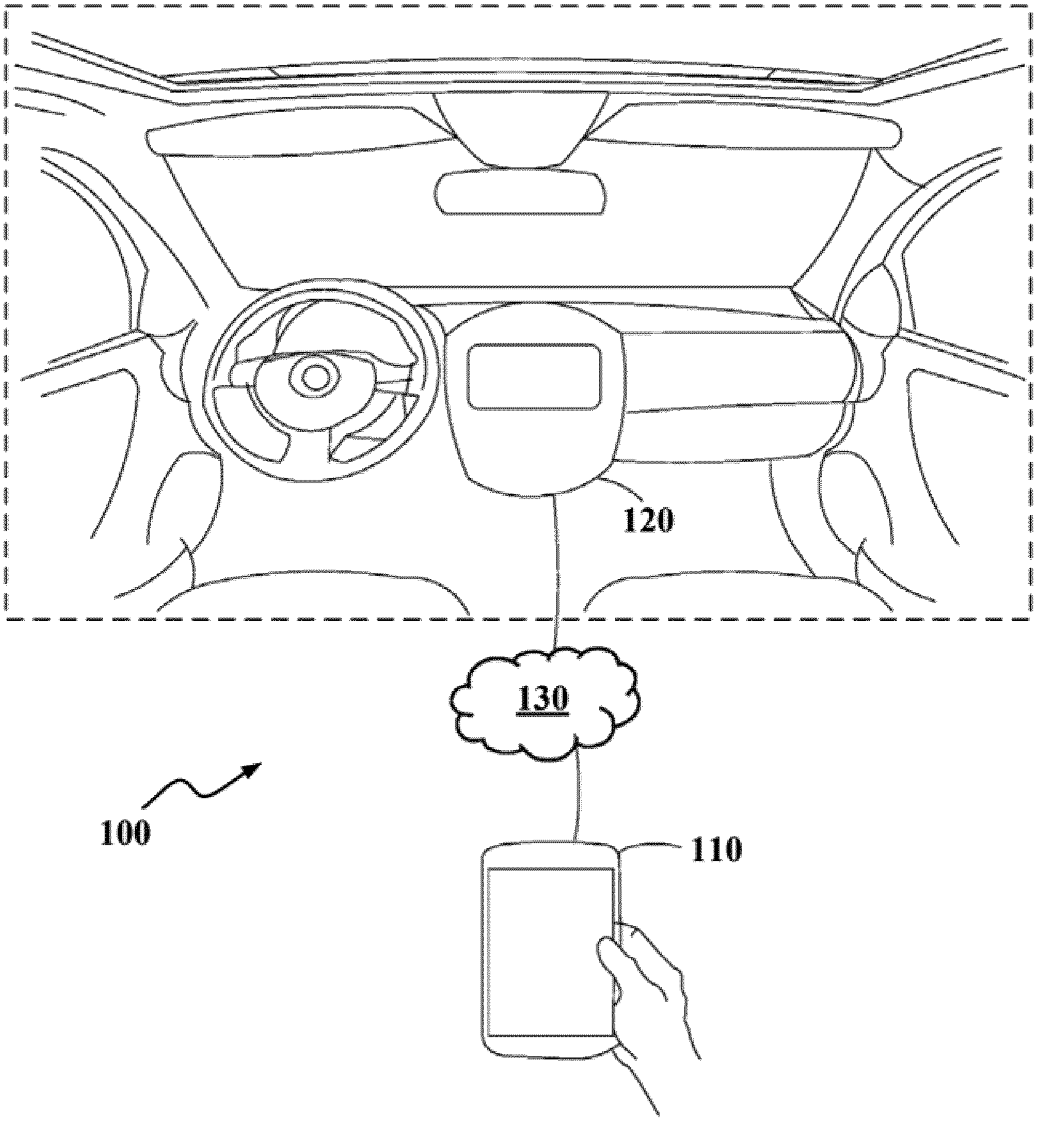
FIG. 1 is a schematic diagram showing an application scenario according to an exemplary embodiment.

In the present disclosure, unless specified otherwise, the terms "first," "second" and the like are used to describe various elements and are not intended to limit the positional relationship, temporal relationship, or importance of these elements. These terms are only used to distinguish one element from another. In some examples, a first element and a second element may point to a same instance, while in some cases, based on the context of description, they can also refer to different instances.

The terms used in the description of various examples in the present disclosure are only for the purpose of describing specific examples and are not intended to limit. Unless indicates otherwise, an element could be one or more if the number of the elements is not specifically defined. As used herein, the term "a plurality of" means two or more, and the term "based on" should be interpreted as "based at least partially on". In addition, the terms "and/or" and "at least one of" indicate any and all possible combinations of the listed items.

It should be understood that the term "vehicle" used herein or other similar terms generally comprise motor vehicles, such as passenger vehicles including cars, sport utility vehicles (SUV), coaches, trucks and various commercial vehicles, vessels including various boats and ships, and aircrafts, and further comprise hybrid vehicles, electric vehicles, plug-in hybrid electric vehicles, hydrogen powered vehicles and other alternative fuel vehicles (e.g., fuel coming from sources other than petroleum).

As used herein, the phrase "vehicle/in-vehicle information system" refers to an in-vehicle system having information processing capability. In some examples, an in-vehicle information system may include or be implemented as one or more in-vehicle electronic control units (ECU). The in-vehicle ECUs can exchange data with other electronic devices in a vehicle (e.g., an in-vehicle sensor) to obtain or control a traveling state of the vehicle and perform various vehicle functions. Alternatively or additionally, the in-vehicle information system may be implemented as an information system integrating various services (sometimes also referred as an in-vehicle infotainment system), and the various services include, but not limited to, remote communication services, entertainment-related services and/or navigation-related services.

In the related art, a vehicle may display or play a message from an in-vehicle system on a display screen within the vehicle, or a message received by the in-vehicle system from a user's electronic device connected thereto. However, at present, there is no solution to performing role setting for an electronic device brought by the user and performing user classification or display limitation for the electronic device according to the role setting. In the related art, messages from all the electronic devices connected to the in-vehicle system are displayed in all vehicle display screens without being classified, which may disturb the driver by some other messages irrelevant to the driver. In addition, such display strategy with no-classification causes some private messages of the driver or passengers to be displayed to all people in the vehicle through all displays.

To relieve, alleviate or solve the above-mentioned problems, the present disclosure provides a device and a method for a vehicle. According to an embodiment of the present disclosure, when a user's mobile electronic device is connected to a vehicle or an in-vehicle information system, role setting will be performed for the mobile electronic device to configure a role for the user or the owner of the connected mobile electronic device (e.g., a driver or a passenger), such that a display device for displaying may be further matched with information or notification contents (e.g., incoming calls, messages or notifications) from the mobile electronic device. Therefore, at least one of, for example, the following advantages is provided. First, information or notifications from mobile electronic devices of different roles may be transmitted to and displayed on the display devices used by the roles and may not be displayed on all the display devices of all the vehicles. Therefore, the driver can pay more attention to driving since the driver is not disturbed by information that should be displayed to passengers, and thus the driving safety is improved. Second, displaying communication contents (e.g., incoming calls, messages or notifications) received by the mobile electronic device on a user-specific display device or a human-computer interface terminal may also increase protection on information privacy and improve the user experience. Third, after the mobile electronic devices connected to the vehicle are configured with roles, information from these different mobile electronic devices may be associated with different display devices in the vehicle. When new information is received, the system may distribute the information more efficiently and quickly to display the information on the associated display devices, thereby further improving the processing efficiency of the system.

The exemplary embodiments of the present disclosure are described specifically below in combination with the accompanying drawings.

FIG. 1 is a schematic diagram showing an application scenario 100 according to an exemplary embodiment. The application scenario 100 may include a mobile electronic device 110 and a vehicle device (here, taking an in-vehicle information system 120 as an example) connected thereto, wherein the mobile electronic device 110 and the in-vehicle information system 120 are connected through a network 130 (such as a wired network and/or a wireless network).

The mobile electronic device 110 is generally a mobile device held by the driver of the vehicle or other users in the vehicle, for example, including, but not limited to a smart phone, a mobile phone, a mobile computer, a tablet computer, a personal digital assistant (PDA), an electronic reader, a multimedia player, a smart television, a wearable device (e.g., a smart watch, smart glasses and a smart bracelet) or the like.

As an example of the vehicle device connected to the mobile electronic device 110, the in-vehicle information system 120 is an integrated information system having information processing capability, as mentioned above. The in-vehicle information system 120 generally provides some common functions, for example, answering calls, displaying messages and notifications, media player, radio, navigation, reversing camera, etc.

A user may interact with the in-vehicle information system 120 via the mobile electronic device 110 or may directly interact with the in-vehicle information system 120, for example, by gesture request input, voice request input, physical-keys request input and/or virtual-keys request input. In some exemplary embodiments, the physical-keys, for example, may include in-vehicle physical buttons, switches, driving levers, knobs and other physical operable keys, and the virtual-keys, for example, may include virtual buttons, switches, driving levers, knobs on in-vehicle touch screens, and other virtual operable keys, which are not limited herein.

The application scenario 100 may further include a server and one or more communication networks for coupling the mobile electronic device 110 and the in-vehicle information system 120 to the server (the server and the communication networks are not shown in the figures). The server may send to the mobile electronic device 110 and the in-vehicle information system 120 contents for these terminal devices to display.

Figure 2:
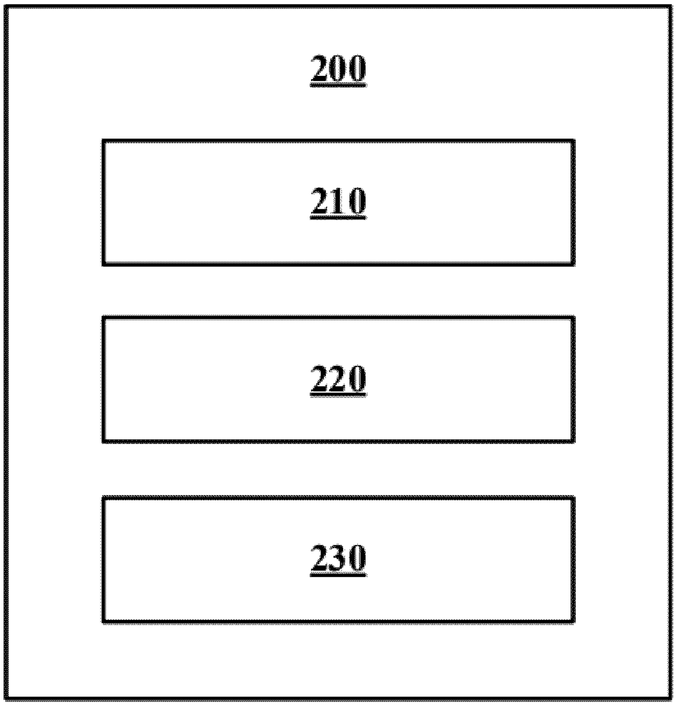
FIG. 2 is a schematic block diagram showing an in-vehicle information system according to an exemplary embodiment.
Figure 3:
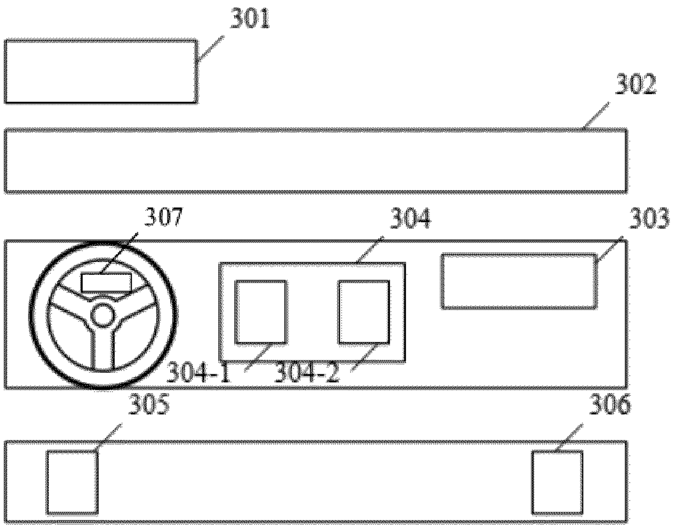
FIG. 3 is a layout diagram showing a vehicle display device according to an exemplary embodiment.

FIG. 2 shows a schematic block diagram of an in-vehicle information system 200 according to an exemplary embodiment. FIG. 3 shows a layout diagram of an exemplary display device in the in-vehicle information system 200.

Referring to FIG. 2, the in-vehicle information system 200 includes at least one display device 210, at least one memory 220 configured to store a computer program and at least one processor 230 configured to execute the computer program. By executing the computer program, the at least one processor 230 is configured to display a role configuration interface on the at least one display device in response to determining that a user's mobile electronic device is communicatively connected to the in-vehicle information system, the role configuration interface comprising role options for assigning a user role for the mobile electronic device; receive user input for the role options in the role configuration interface; and associate the mobile electronic device with function limitations corresponding to the user role assigned by the user input such that at least part of the functions of the in-vehicle information system is selectively available to the mobile electronic device depending on the assigned user role. The in-vehicle information system 200 may be an example of the in-vehicle information system 120 shown in FIG. 1.

Referring to FIG. 3, according to some embodiments, at least one display device of the in-vehicle information system 200, for example, may include: a display specific for the driver (e.g., a heads-up display HUD 301, a panel display 307 and a central console display 304), a display specific for a passenger (a display 303 located in front of the copilot, a seat display, a display 305 located on the left side of the back row and a display 306 located on the right side of the back row), and a display for both the driver and the passenger (e.g., a HUD 302 located at the front row and the central console display 304). It can be understood that different display regions (e.g., 304-1 and 304-2) of the same display may also be considered as different displays.

In other embodiments, the in-vehicle information system 200 may include fewer or more displays, which is not limited herein. In addition, the in-vehicle information system 200 may further include other in-vehicle facilities or communicate with other in-vehicle facilities. Examples of the in-vehicle facilities include, but not limited to, speakers, microphones, cameras, in-vehicle atmosphere lights, seat adjusting systems, rearview mirror adjusting systems and air conditioning systems.

Figure 4:
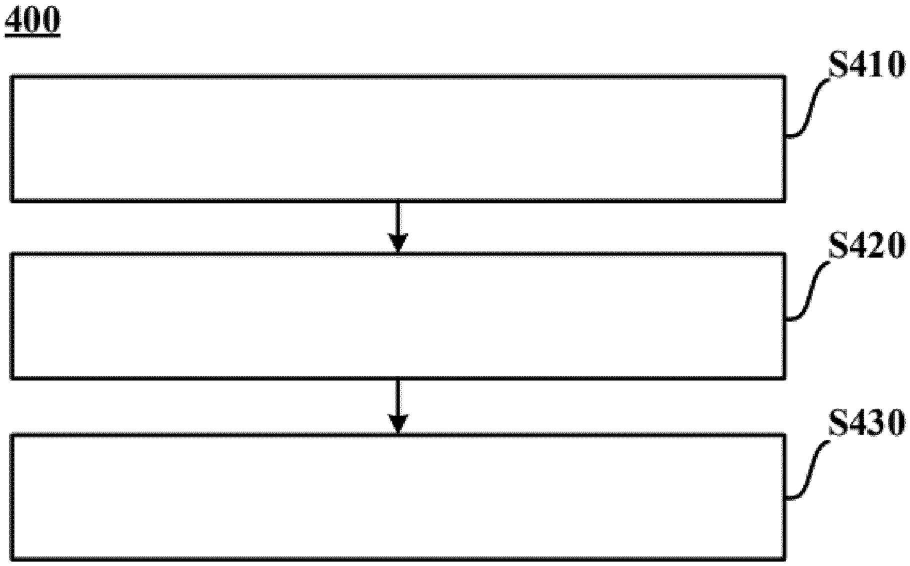
FIG. 4 is a flow diagram showing a method for an in-vehicle information system according to an exemplary embodiment.

FIG. 4 is a flow diagram showing a method 400 for an in-vehicle information system according to an exemplary embodiment. The method 400 may be executed, for example, in the in-vehicle information system 200.

Referring to FIG. 4, in step S410, a role configuration interface is displayed on at least one display device in response to determining that a user's mobile electronic device is communicatively connected to the in-vehicle information system, and the role configuration interface includes role options for assigning a user role for the mobile electronic device.

According to some embodiments, communicative connection of the mobile electronic device and the in-vehicle information system may be wired or wireless connection, including, but not limited to, infrared connection, Bluetooth connection, WiFi connection, WiMax connection, cellular connection and/or other similar connections.

Figure 5A:
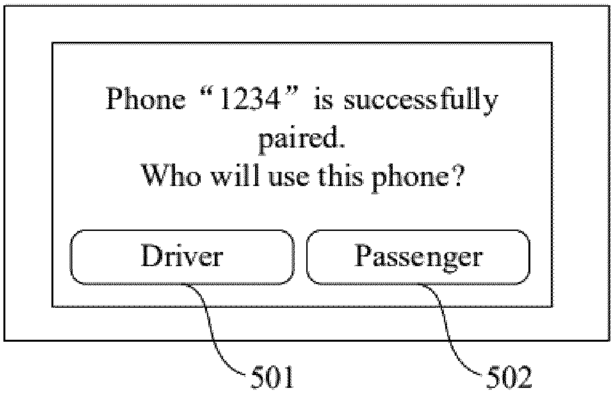
FIGS. 5A to 5C are schematic diagrams showing a user interface of a display device according to an exemplary embodiment.

According to some embodiments, the role configuration interface (as shown in FIG. 5A) may include role options for assigning user roles. As an example, in the role configuration interface in FIG. 5A, a role option 501 for assigning the user of the mobile electronic device as driver and a role option 502 for assigning the user of the mobile electronic device as passenger are shown respectively. In other embodiments, the role options may adopt other forms, such as an option "yes" for assigning the user of the mobile electronic device as driver and an option "no" for assigning the user of the mobile electronic device as not a driver. In this case, if the option "no" is selected, the user of the mobile electronic device is assigned as passenger. It can be understood that classification of roles not only includes driver and passenger, but also includes other roles alternatively, which is not limited herein. According to some embodiments, these role options 501 and 502 and role information may be predefined or edited by the users.

In step S420, user input for the role options in the role configuration interface is received.

According to some embodiments, receiving the user input for the role options in the role configuration interface includes at least one selected from the following: receiving touch input of the role options via the role configuration interface; and receiving voice input of the role options in the role configuration interface. In addition, according to some embodiments, the method of inputting role information may be correspondingly changed or adjusted according to the displaying manner of the role configuration interface. When the role configuration interface provides an input function for the user, the method of inputting the role information by the user may be, for example, manual filling input or voice input, and when the role configuration interface provides role configuration options for the user in a selection manner, the user may, for example, complete the role information input by directly selecting the corresponding role option.

In step S430, the mobile electronic device is associated with function limitations corresponding to the user role assigned by the user input such that at least part of the functions of the in-vehicle information system is selectively available to the mobile electronic device depending on the assigned user role.

According to some embodiments, the mobile electronic device is associated with the function limitations corresponding to the assigned user role through user input or selection to configure the role information for the connected mobile electronic device. For this, a device may store associated information between the role information and the mobile electronic device. It should be understood that the matching between the user role and the mobile electronic device may be one to one, one to many, many to one, or many to many. In other words, one role may use a plurality of mobile electronic devices at one time, and the same mobile electronic device may also be used by a plurality of roles at the same time. In one exemplary embodiment, a driver may use a Bluetooth earphone and a mobile phone connected to the vehicle device simultaneously, and the same tablet computer may be used by different passengers at the same time.

Figure 5B:
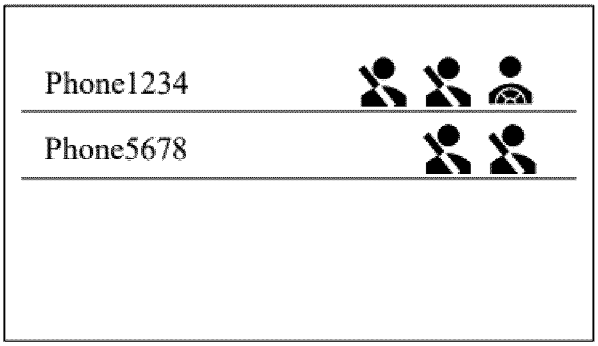

According to some embodiments, display devices of the in-vehicle information system include a driver-specific display and a plurality of passenger-specific displays, and the role options may further include options for specifying which one or more of the displays from the driver-specific display and the plurality of passenger-specific displays to associate with the mobile electronic device. Therefore, information from the mobile electronic device is allowed to be output via the one or more displays in response to determining that the mobile electronic device is associated with the one or more displays. Here, the plurality of passenger-specific displays may refer to a plurality of displays configured for different passenger seats or may also refer to a plurality of displays configured for a same passenger seat. Referring to FIG. 5B, in this example, "phone1234" is associated with two passenger displays and a driver display, and "phone5678" is associated with two passenger displays. Therefore, information from the device "phone1234" will be displayed on the two passenger displays and the driver display associated with the device, while information from the device "phone5678" will be displayed on the two passenger displays associated with the device.

According to some embodiments, the role options may further include options for specifying which one of a plurality of user identifiers to be registered by the mobile electronic device, each user identifier may have a corresponding user profile that defines personalized settings for in-vehicle facilities. In addition, the operations may further include in response to determining that the mobile electronic device is registered to a user identifier of the plurality of user identifiers enabling a personalization setting corresponding to the user identifier.

In the case that the mobile electronic device is associated with a user ID, in yet another exemplary embodiment, the mobile electronic device is registered to the user identifier (e.g., the user profile), thereby associating the mobile electronic device with a specific user, such that the system may notify the specific user of information from a certain mobile electronic device. Therefore, the system may further invoke certain information that is pre-stored by the user or previously recorded by the system, such as using habits and function reminding settings, and thus adapt the displayed contents and enable the personalization setting corresponding to the user identifier.

According to some embodiments, based on the above role configuration function, display limitation may be further performed on the corresponding user role to achieve a display function depending on the user role. Based on the user role matching for the mobile electronic device, output of information from the mobile electronic device to the one or more display devices may be limited.

According to some embodiments, the information from the mobile electronic device may include incoming calls, videos, audios, notifications, and other information to be displayed on the display device. Correspondingly, the function options, for example, include a call limitation option for setting whether to allow call information from the mobile electronic device assigned as the passenger role to be output via the at least one display device, a video limitation option for setting whether to allow video information from the mobile electronic device assigned as the passenger role to be output via the at least one display device, an audio limitation option for setting whether to allow audio information from the mobile electronic device assigned as the passenger role to be output via in-vehicle speakers, and a message limitation option for setting whether to allow text from the mobile electronic device assigned as the passenger role to be output via the at least one display device or the in-vehicle speakers.

In an exemplary embodiment, the mobile electronic device is associated with the function limitations corresponding to a driver role in response to determining that the user is assigned as the driver role, wherein the function limitations corresponding to the driver role allow information from the mobile electronic device to be output via the driver-specific display, and/or the mobile electronic device is associated with the function limitations corresponding to a passenger role in response to determining that the user is assigned as the passenger role, wherein the function limitations corresponding to the passenger role prevent information from the mobile electronic device from being output via the driver-specific display.

In another exemplary embodiment, the function limitations corresponding to the driver role prevent the information from the mobile electronic device assigned as the driver role from being output via the passenger-specific displays, and the function limitations corresponding to the passenger role allow the information from the mobile electronic device assigned as the passenger role to be output via the passenger-specific displays.

In the above cases, specific display of information may be achieved, that is, information belonging to a certain role will be displayed on the display device used by that role. Such role-dependent display strategy is advantageous, because both the driver and the passengers only receive the information that should be received by themselves, instead of being disturbed by the information that should be received by others. In this way, the driver may pay more attention to driving, and the users' privacy may also be protected. It can be understood that some display devices may be used by the driver and the passengers at the same time, and information may be configured to be displayed on these display devices without limitations. In an exemplary embodiment, when the display device (e.g., the front row HUD or the central console display) is available for both the driver and the passengers at the same time, a display region may be divided so as to display the device information with the role classified as the driver on a display region 304-1 closer to the driver (e.g., in front of or at the right side of the driver) and display the device information with the role classified as the passenger on a display region 304-2 closer to the passenger (e.g., in front of or at the left side of the copilot).

It should further be understood that, according to some embodiments of the present disclosure, the same or different limiting strategies may be implemented on all roles, and it is also possible that only one role is limited while other roles are not limited. In an exemplary embodiment, display limitation is only performed on the passenger role, such that information of the mobile electronic device used by the passenger will not be displayed on the display device used by the driver, and thus the driver can pay attention to driving; and the driver role is not limited and may use all the functions, such that information from the mobile electronic device used by the driver may also be displayed on all the display devices in the vehicle, and thus when the driver cannot notice the information in the first time, the passengers in the vehicle may remind the driver, and vice versa.

Figure 5C:
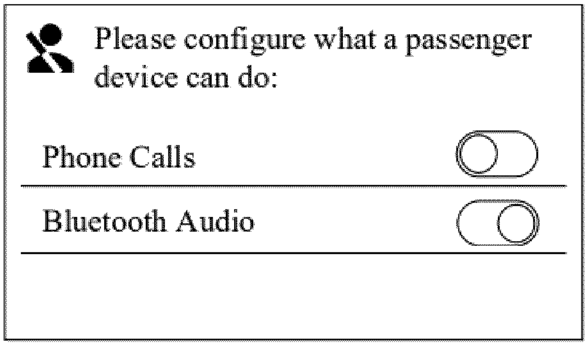

According to some embodiments, based on role configurations, display limitation may be performed on all information of the connected mobile devices or performed on part of the functions. For this, a function configuration interface is displayed on at least one display device, and the function configuration interface (as shown in FIG. 5C) includes function options for setting function limitations for the passenger role. In an exemplary embodiment, based on the received role information, function limitations corresponding to role information are displayed on display devices.

As an exemplary embodiment, the function options may include a call limitation option (e.g., for the user to set whether to allow call information from the mobile electronic device to be output via the display device), a video limitation option (e.g., for the user to set whether to allow video information from the mobile electronic device to be output via the display device), an audio limitation option (e.g., for the user to set whether to allow audio information from the mobile electronic device to be output via the in-vehicle speaker), a message limitation option (e.g., for the user to set whether to allow text from the mobile electronic device to be output via the display device and/or the in-vehicle speaker), an application notification limitation option and the like. As an exemplary embodiment, when the call limitation of a mobile phone configured as the passenger role is in an active state and the paired mobile phone receives a call, the system will not notify the driver of the incoming call. As another exemplary embodiment, when the Bluetooth audio limitation of a mobile electronic device configured as the passenger role is in an active state, the system will not be able to play audios from the device. It should further be understood that if the mobile electronic device could provide more functions, the system may enable or disable these functions, which is not limited herein.

Similar to input of role options, input of function options may also be implemented in different ways, for example, manual filling, voice input, option selection or the like. In an exemplary embodiment, based on the received function limitation strategy, output of the information associated with the function limitations to one or more display devices is limited. It should be further understood that, according to some embodiments of the present disclosure, the function selection strategy is variable, that is, the user may adjust or edit the function selection strategy to make it meet usage requirements better, thereby increasing the system flexibility, user privacy and user experience.

According to one aspect of the present disclosure, a non-transitory computer-readable storage medium with a computer program stored thereon is provided, and when executed by a processor of an in-vehicle information system, the computer program implements the steps of any method embodiment described above.

According to one aspect of the present disclosure, a computer program product with a computer program is provided, and when executed by a processor of an in-vehicle information system, the computer program implements the steps of any method embodiment described above.

According to one aspect of the present disclosure, a vehicle including the in-vehicle information system of any embodiment described above is provided.

Figure 6:
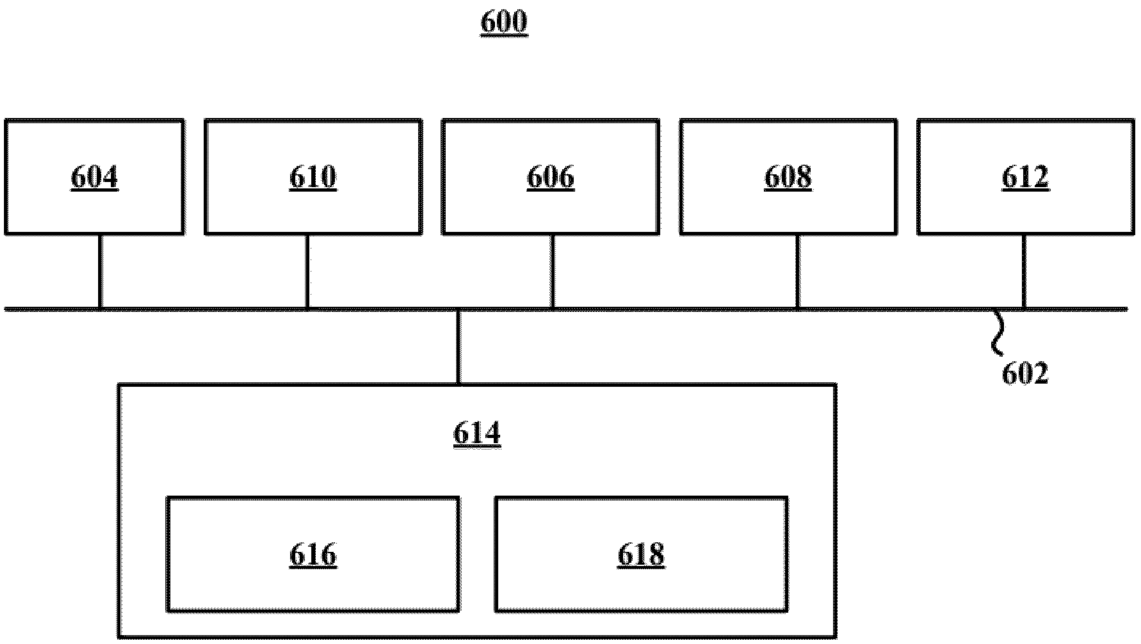
FIG. 6 is a block diagram showing an exemplary system that can be applied to an exemplary embodiment.

FIG. 6 shows an exemplary configuration of a system 600 that may be configured to implement various embodiments described herein. The above in-vehicle information system 200 may be completely or at least partially implemented by the system 600 or other similar devices or systems.

The system 600 may include elements connected to or communicating with a bus 602 (e.g., via one or more interfaces). For example, the system 600 may include the bus 602, one or more processors 604, one or more input devices 606 and one or more output devices 608. The one or more processors 604 may be processors of any type and may include, but not limited to, one or more general-purpose processors and/or one or more dedicated processors (e.g., special processing chips). The one or more processors 604 are examples of the at least one processor 230 described above. The input device 606 may be device of any type capable of inputting information to the system 600, and may include, but not limited to, a mouse, a keyboard, a touch screen, a microphone and/or a remote control. The output device 608 may be device of any type capable of presenting information, and may include, but not limited to, a display, a speaker, a video/audio output terminal, a vibrator and/or a printer. The system 600 may further include a non-transitory storage device 610 or may be connected with the non-transitory storage device 610, and the non-transitory storage device may be any storage device that is non-transitory and may implement data storage, and may include, but not limited to, a disk drive, an optical storage device, a solid state memory, a floppy disk, a flexible disk, a hard disk, a tape or any other magnetic medium, an optical disk or any other optical medium, a read-only memory (ROM), a random access memory (RAM), a cache memory and/or any other memory chip or box, and/or any other medium from which a computer may read data, instructions and/or codes. The non-transitory storage device 610 may be detached from the interface. The non-transitory storage device 610 may possess data/programs (including instructions)/codes for implementing the above methods and steps. The system 600 may further include a communication device 612. The communication device 612 may be device or system of any type capable of communicating with external devices and/or network, and may include, but not limited to, modems, network cards, infrared communication devices, wireless communication devices and/or chipsets, such as Bluetooth™ devices, 1302.11 devices, WiFi devices, WiMax devices, cellular communication devices and/or other similar objects.

When the system 600 is used as an in-vehicle system, the system 600 may further be connected to an external device, such as a GPS receiver, and sensors configured to sense different environment data (such as an acceleration sensor, a wheel speed sensor and a gyroscope), etc. In this way, the system 600 may, for example, receive position data and sensor data indicating the traveling condition of the vehicle. When the system 600 is used as the in-vehicle system, the system 600 may further be connected to other facilities (such as an engine system, a windscreen wiper, and an anti-lock brake system) for controlling traveling and operations of the vehicle.

In addition, the non-transitory storage device 610 may have map information and software elements to enable the processor 604 to execute route guiding processing. In addition, the output device 608 may include a display for displaying a map, a position mark of the vehicle and an image for indicating the traveling condition of the vehicle. The output device 608 may further include a speaker with an earphone for audio guidance, or an interface.

The bus 602 may include, but not limited to, an industry standard architecture (ISA) bus, a micro-channel architecture (MCA) bus, an enhanced ISA (EISA) bus, a video electronics standards association (VESA) local bus, and a peripheral component interconnection (PCI) bus. Specifically, for the in-vehicle system, the bus 602 may include a controller area network (CAN) bus or other architectures designed for applications on automobiles.

The system 600 may further include a working memory 614, which may be working memory of any type that may store programs (including instructions) and/or data useful for working of the processor 604, and may include, but not limited to, a random-access memory and/or a read-only memory device.

Software elements (programs) may be in the working memory 614, and include, but not limited to, an operating system 616, one or more applications 618, a drive program and/or other data and codes. Instructions for executing the above methods and steps may be included in the one or more applications 618, and all the above modules for devices of the vehicle may be implemented by reading and executing via the processor 604, the one or more applications 618. Executable codes or source codes of the instructions of the software elements (programs) may be stored in a non-transitory computer-readable storage medium (such as the above storage device 610) and may be stored in the working memory 614 (possibly being compiled and/or installed) when executed. The executable codes or source codes of the instructions of the software elements (programs) may also be downloaded from remote locations.

It should further be understood that various variations may be made according to specific requirements. For example, custom hardware may also be used, and/or specific elements may be implemented with hardware, software, firmware, middleware, microcode, hardware description languages, or any combination thereof. For example, some of or all the disclosed methods and devices may be implemented by programming hardware (for example, programmable logic circuits including field programmable gate arrays (FPGAs) and/or programmable logic arrays (PLAs)) with assembly languages or hardware programming languages (such as VERILOG, VHDL, C++) by using the logics and algorithms according to the present disclosure.

It should further be understood that the name of the system 600 is not intended to limit that the device is located entirely within the vehicle. Components of the system 600 may be distributed on a network. For example, one processor may be used to perform some processing while another processor away from the one processor may perform other processing. Other components of the system 600 may also be distributed in a similar way. In this way, the system 600 may be interpreted as a distributed computing system that performs processing at multiple locations.

Although embodiments or examples of the present disclosure have been described with reference to the accompanying drawings, it should be understood that the above methods, systems and devices are only exemplary embodiments or examples, and the scope of the present disclosure is not limited by these embodiments or examples, but only limited by the authorized claims and their equivalent scopes. Various elements in the embodiments or examples may be omitted or replaced with their equivalent elements. In addition, all the steps may be performed in orders different from those described in the present disclosure. Further, various elements in the embodiments or examples may be combined in various ways. It is important that, as technology evolves, many of the elements described herein may be replaced with equivalent elements that appear after the present disclosure.

What is claimed is:

1. An in-vehicle information system comprising:
- at least one display device;
- at least one memory configured to store a computer program; and
- at least one processor configured to execute the computer program to perform operations comprising:
  - displaying a role configuration interface on at least one of the at least one display device in response to determining that a user's mobile electronic device is communicatively connected to the in-vehicle information system, the role configuration interface comprising role options for assigning a user role for the mobile electronic device;
  - receiving user input for the role options in the role configuration interface; and
  - associating the mobile electronic device with function limitations corresponding to the user role assigned by the user input such that at least part of the functions of the in-vehicle information system is selectively available to the mobile electronic device depending on the assigned user role.

2. The in-vehicle information system according to claim 1, wherein the role options comprise options for assigning the user role as a driver role or a passenger role.

3. The in-vehicle information system according to claim 2, wherein the at least one display device comprises a driver-specific display, and associating the mobile electronic device with function limitations corresponding to the user role assigned by the user input comprises:
- associating function limitations corresponding to the driver role with the mobile electronic device in response to determining that the user role is assigned as the driver role, wherein the function limitations corresponding to the driver role allow information from the mobile electronic device to be output via the driver-specific display; and

- associating function limitations corresponding to the passenger role with the mobile electronic device in response to determining that the user role is assigned as the passenger role, wherein the function limitations corresponding to the passenger role prevent information from the mobile electronic device from being output via the driver-specific display.

4. The in-vehicle information system according to claim 3, wherein the driver-specific display comprises at least one selected from the group consisting of: a heads-up display (HUD), a panel display and a central console display.

5. The in-vehicle information system according to claim 3, wherein:
- the at least one display device further comprises a passenger-specific display,
- the function limitations corresponding to the driver role prevent information from the mobile electronic device of the user assigned as the driver role from being output via the passenger-specific display, and
- the function limitations corresponding to the passenger role allow information from the mobile electronic device of the user assigned as the passenger role to be output via the passenger-specific display.

6. The in-vehicle information system according to claim 5, wherein the passenger-specific display comprises at least one of the respective displays configured for multiple passenger seats.

7. The in-vehicle information system according to claim 2, wherein the operations further comprise:
- displaying a function configuration interface on at least one of the at least one display device, the function configuration interface comprising function options for setting the function limitations for the passenger role.

8. The in-vehicle information system according to claim 7, wherein the function options comprise at least one selected from the group consisting of:
- an incoming call limitation option for setting whether to allow incoming call information from the mobile electronic device of the user assigned as the passenger role to be output via the at least one display device;
- a video limitation option for setting whether to allow video information from the mobile electronic device of the user assigned as the passenger role to be output via the at least one display device;
- an audio limitation option for setting whether to allow audio information from the mobile electronic device of the user assigned as the passenger role to be output via in-vehicle speakers; and
- a message limitation option for setting whether to allow text from the mobile electronic device of the user assigned as the passenger role to be output via the at least one display device or the in-vehicle speakers.

9. The in-vehicle information system according to claim 2, wherein:
- the at least one display device comprises a driver-specific display and a plurality of passenger-specific displays,
- the role options further comprise options for specifying which one or more of the driver-specific display and the plurality of passenger-specific displays to be associated with the mobile electronic device, and
- the operations further comprise allowing information from the mobile electronic device to be output via the one or more displays in response to determining that the mobile electronic device is associated with the one or more displays.

10. The in-vehicle information system according to claim 2, wherein:

the role options further comprise options for specifying which one of a plurality of user identifiers to be registered by the mobile electronic device and each user identifier has a corresponding user profile that defines personalized settings for in-vehicle facilities, and the operations further comprise, in response to determining that the mobile electronic device is registered to a user identifier of the plurality of user identifiers, enabling a personalization setting corresponding to the user identifier.

11. The in-vehicle information system according to claim 1, wherein the user input comprises at least one selected from the group consisting of:

touch input for the role options received through the role configuration interface; and voice input for the role options in the role configuration interface.

12. A vehicle comprising the in-vehicle information system according to claim 1.

13. A method for an in-vehicle information system, the in-vehicle information system comprising at least one display device, the method comprising:

displaying a role configuration interface on at least one of the at least one display device in response to determining that a user's mobile electronic device is communicatively connected to the in-vehicle information system, the role configuration interface comprising role options for assigning a user role for the mobile electronic device;

receiving user input for the role options in the role configuration interface; and associating the mobile electronic device with function limitations corresponding to the user role assigned by the user input such that at least part of the functions of the in-vehicle information system is selectively available to the mobile electronic device depending on the assigned user role.

14. A computer product comprising a non-transitory computer-readable storage medium having stored thereon program code which, when executed by a processor, performs the method according to claim 13.

* * * * *